Aug. 20, 1963            E. FOUGEA            3,101,127
SUPPORTING DEVICE FOR A WORKING PLATFORM
Filed June 7, 1961            5 Sheets-Sheet 1
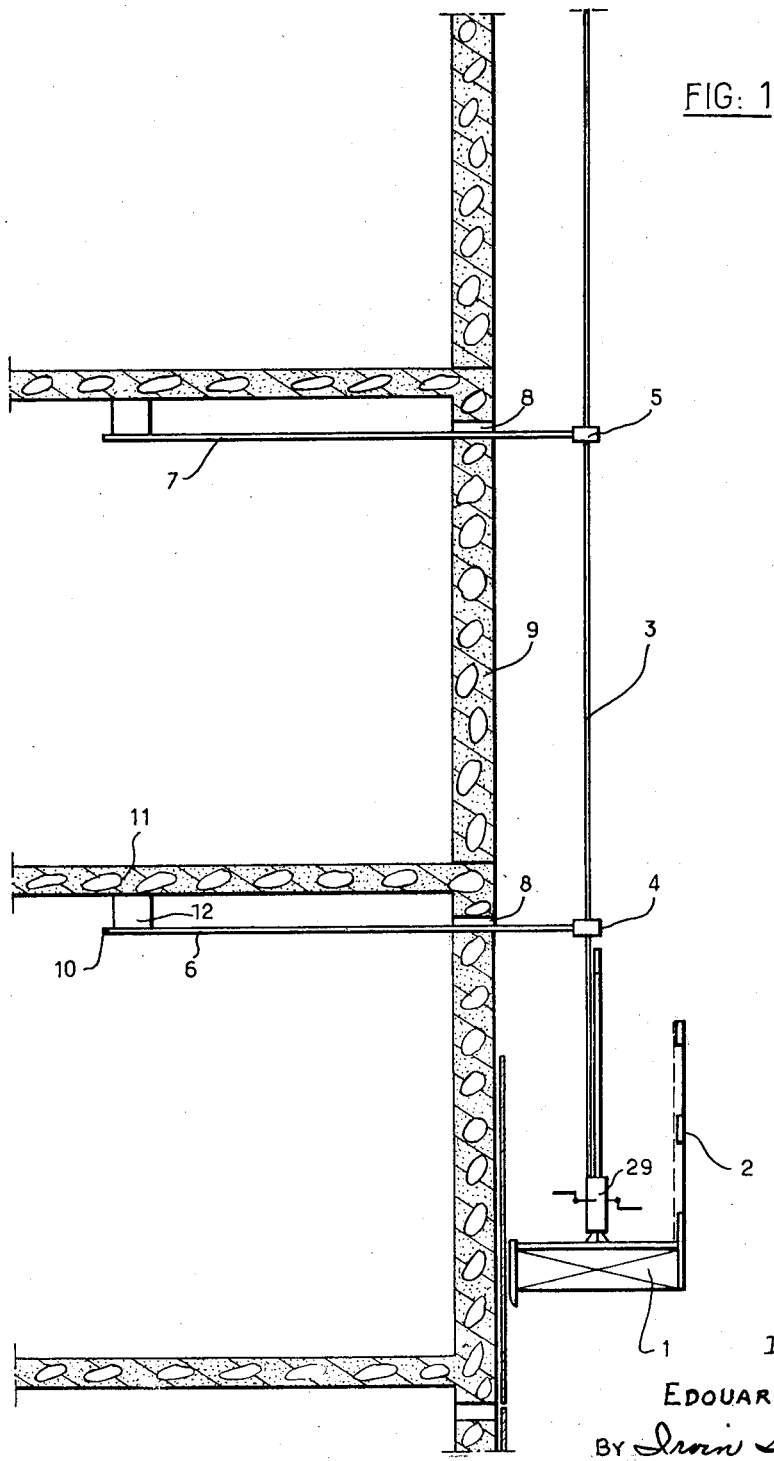
FIG: 1
INVENTOR:
EDOUARD FOUGEA
BY Irwin S. Thompson
ATTORNEY

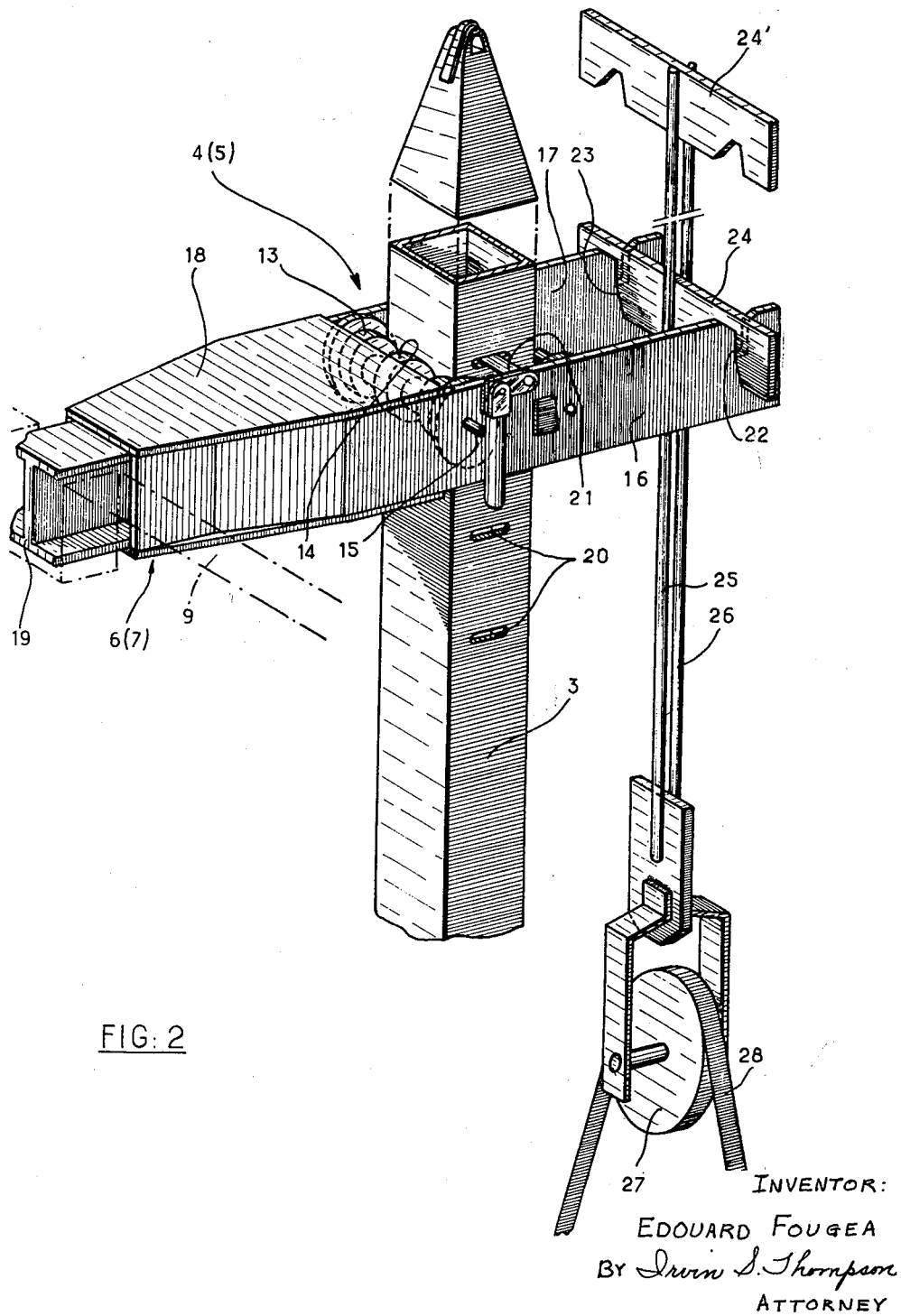
FIG: 2

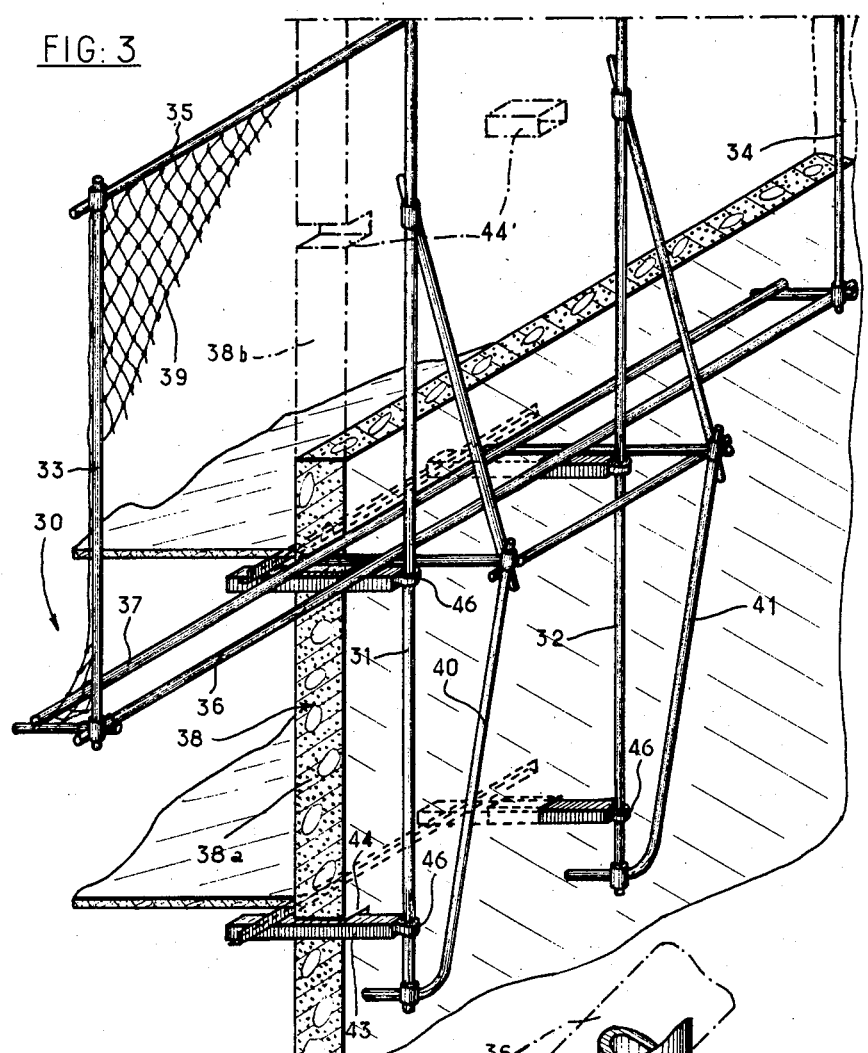
FIG: 3
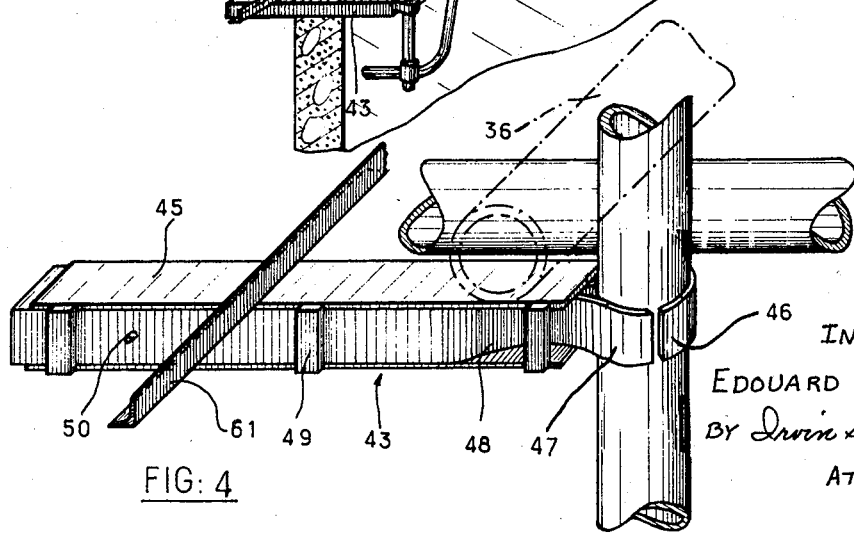
FIG: 4
INVENTOR:
EDOUARD FOUGEA
BY Irvin S. Thompson
ATTORNEY

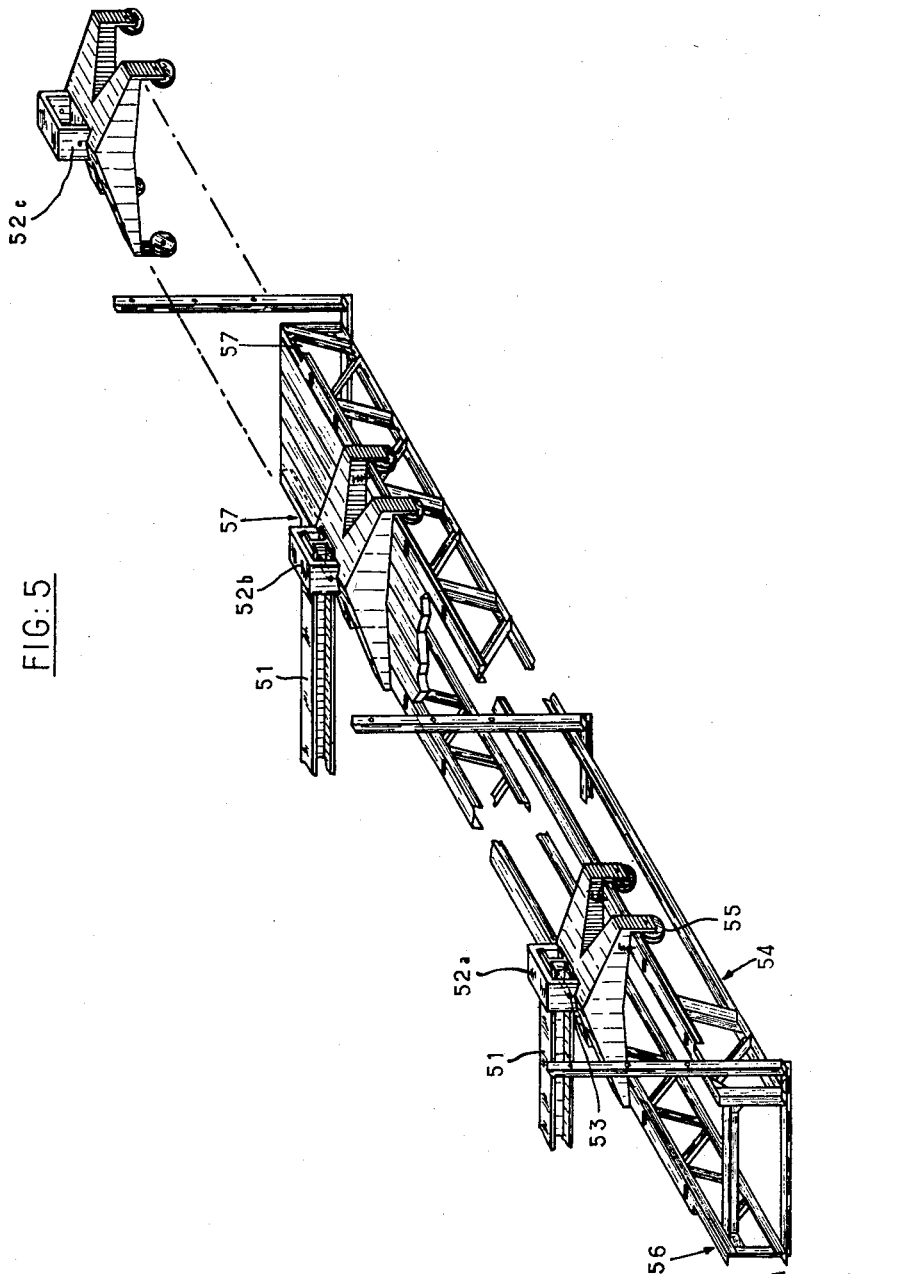

Aug. 20, 1963 E. FOUGEA 3,101,127
SUPPORTING DEVICE FOR A WORKING PLATFORM
Filed June 7, 1961 5 Sheets-Sheet 5
FIG: 6
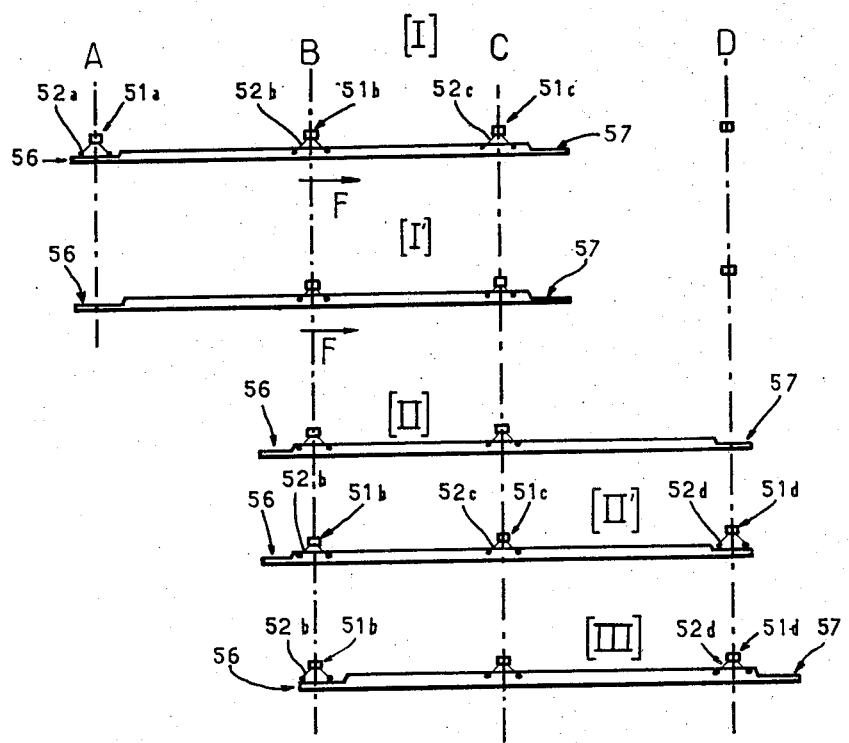
INVENTOR:
EDOUARD FOUGEA
BY Irwin S. Thompson
ATTORNEY

United States Patent Office 3,101,127
Patented Aug. 20, 1963

3,101,127
SUPPORTING DEVICE FOR A WORKING PLATFORM
Edouard Fougea, Neuilly, France, assignor to Constructions Edmond Coignet, Neuilly, France, a corporation of France
Filed June 7, 1961, Ser. No. 115,510
Claims priority, application France July 20, 1960
7 Claims. (Cl. 182—147)

The present invention relates to a supporting device for a travelling cradle for buildings in course of construction, and particularly a travelling cradle intended to be moved vertically and/or horizontally along the outer face of the wall of the building during the course of erection of the said building, for example in order to carry out surface-covering work or to provide a safety net at the upper periphery of the outer wall in construction, so as to avoid all risk of accident.

A supporting device according to the invention comprises a series of horizontal supporting arms or brackets, fixed in holes pre-formed uniformly over the whole of the said wall, means for suspending the working cradle from the said supporting arms or brackets, these suspension means, permitting a sliding movement in at least one direction, horizontal or vertical, of the said working cradle, so that the movement of the working cradle is effected by freeing those supporting arms which are located in the zone behind the working cradle with respect to the direction of movement of the latter, and placing the supporting arms in the zone in front of the working cradle with respect to the direction of movement of this latter. In this way, a continuous forward movement of the working cradle may be ensured, the means effecting the forward movement being either rigidly fixed to the working cradle and supported on the supporting arms, or external, for example a crane.

A device of this kind can be applied for example to a working platform for work on the fronts of buildings, either constructed or in course of construction. In this case, the supporting arms or brackets each slidably receive at their outer extremities a vertical mast rigidly fixed to the platform which comprises at least one winch with a cable one extremity of which is fixed to the winch and the other to the platform, pins being engaged through the masts above the end portions of the brackets on which the said pins are supported. According to a particular form of construction, the cable passes over a return-pulley, the shaft of which is supported by the brackets.

As and when the platform moves upwards under the tractive effort of the winch, the vertical masts are engaged in new higher brackets, while the lower brackets are removed. The pulley supports are also raised, which is possible by virtue of the safety pin which enables the winch or winches to be released.

The supporting device for the platform may also be arranged so as to ensure a limited horizontal movement of this latter. To this end, the platform is suspended for horizontal sliding movement on trolleys connected to the bracket. The coupling of the trolleys to the brackets may be inextensible (no vertical movement), or alternatively each trolley is fixed at the lower extremity of a guiding mast mounted for vertical sliding movement in the horizontal brackets, so that in addition to the horizontal mast the platform can use a vertical mast.

A further application contemplated by the invention relates to net-carrier frames intended to be placed along the peripheral upper edge of a building in course of construction.

A frame of this kind comprises at least two vertical tubes slidably engaging in sleeves locked on the end of supporting arms, and the placing in position and removal of a supporting arm are carried out from inside the building, whereas the movement of the frame is effected by a crane.

The particular features and advantages of the present invention will furthermore be clearly brought out from the description which follows below by way of example, reference being made to the accompanying drawings, in which:

FIG. 1 is a view in side elevation of an exterior platform provided with a safety device according to the invention;

FIG. 2 is a view in partial perspective of a detail of FIG. 1;

FIG. 3 is a view in perspective of a protection device according to the invention;

FIG. 4 is a view of a detail of FIG. 3;

FIG. 5 is a perspective view of an alternative form of construction of a working platform according to the invention;

FIG. 6 shows diagrammatically the method of operating the device shown in FIG. 5.

In accordance with the form of embodiment chosen and shown in FIGS. 1 and 2, a platform comprises a flooring 1 constituted by a metal lattice girder and a parapet 2. The platform is fixed to a plurality of vertical masts 3 spaced apart along the platform and engaging for sliding and locking in guiding devices 4 and 5 formed at the outer ends of horizontal brackets 6 and 7, respectively, introduced through passages 8 formed in the outer wall 9 of the building. The inner extremity 10 of each bracket is supported against the adjacent floor 11 by the intermediary of a wedge 12.

The guiding devices 4, 5—formed at the outer extremities of the brackets 6, 7—consist of two sets of rollers 13 and 14, with transverse shafts 15 supported on two arms 16 and 17 of a member 18 welded on the end of the body of the profiled bracket 19. A mast 3 which is hollow and of square section slides between these sets of rollers. Each mast 3 contains two series of holes 20 facing each other transversely with respect to the brackets 6, 7, so as to ensure the locking of the mast 3 on a bracket 6 by engagement of a stop and safety pin 21, the extremities of which are supported on the two arms 16 and 17 of the member 18.

The extremities of the arms 16 and 17 are extended beyond the rear set of guiding rollers of the mast, and comprise two upper slots 22 and 23, intended to serve as a seating for a transverse supporting plate 24, also slotted, this plate 24 being rigidly fixed to a double rod 25, 26, carrying in addition one or more further plates 24' supported at the extremities of upper brackets 6 and 7.

Each double rod 25, 26 carries at its lower extremity a pulley 27, over which passes a cable 28, one end of which is rigidly fixed to a winch 29 anchored to the platform, and the other end of which is directly anchored to the platform. The pulley may be dispensed with if the weight of the whole of the device and if the strength of the lifting device eventually employed so permit.

In order to raise the platform to the desired level, the winches 29 are operated; the platform moves upwards together with the masts 3, while remaining secured by the pins 21 rising above the associated bracket 6. In the desired position, another pin is inserted through further holes 20, those now located immediately above a bracket, and the original pins 21 are removed as they are now useless.

When the platform reaches the level of the lower bracket 6, its subsequent upward movement being prevented by this bracket, the cable of the winches 29 is released and the platform is suspended on the brackets 7 and following, through the intermediary of the pins 21. The suspension plates 24 and 24' of the pulleys 27 are disengaged, and each is caused to rest respectively on a bracket immediately higher. The shaft 15 of the front rollers 13 and 14 of the lower bracket is unkeyed, and the lower bracket itself is disengaged from the inside of the building and replaced at the story located immediately above the upper bracket. The winches 29 can then be operated, and the upward movement of the platform can be continued at the desired moment.

In this way, a continuous upward movement of the platform is ensured, story by story, while constantly maintaining locking pins in sufficient number to ensure complete safety against any risk of breakage of the suspension.

There will now be described with reference to FIGS. 3 and 4, a protection frame for work carried out at the highest points of a building in course of construction. This frame 30 comprises a tubular armature constituted by two vertical tubes 31 and 32 supporting a panel 33, 34, 35 and 36; the device is fixed on the wall 38, on the outer side, by the upper curved-back extremities (not shown) of the tubes 31 and 32 on the one hand and by the lower curved-back extremities of the tubes 40 and 41 forming struts, on the other hand, and on the inner side of the wall 38 by fixing a wedge between the angle-iron 50 and the inner face of the wall 38; the panel carries a net 39 over its entire surface.

It will be understood that if necessary there are provided bracing struts and cross-bars to stiffen the tubular structure of the net-carrying frame.

The tubes 31 and 32 are slidably mounted between the hook 46 and the bolt 47 which are rigidly fixed to arms 43 engaged in orifices 44, previously formed uniformly in the wall 38.

These arms (FIG. 4) are constituted by a girder section 45 in the form of a U, at one extremity of which is welded the member 46 in the shape of a cylindrical hook, which is closed by the curved-back extremity 47 of a blade 48 sliding in the interior of the section 45, and which is prevented from disengagement by cross-members 49 welded transversely across the flanges of the section 45. The hook 46 and the bolt 47 grip the vertical tubes 31 and 32, while the horizontal tubes 36 are supported on those profiled girders 45 which are located in the central portion of the panel.

In the position indicated in FIG. 4, a pin 50 locks the blade 48 to the support 45 so as to prevent any opening of the sleeve formed by the hook 46 and the bolt 47. In addition, a bar 61 is welded transversely on the support 45, this bar 61 being located inside the building and being intended to prevent the supporting arm 43 from being ejected towards the exterior.

The net carrier frame is installed on a portion of wall 38a and surmounts a portion of wall 38b to be built.

Safety frames of this kind, arranged in line at the upper periphery of a building in course of construction, ensure complete safety both for the personnel working above against risk of falling and also for the personnel working on the ground against the risk of accidents due to objects falling from the top of the building.

When the story 38b of the building has been built, the frame is hooked by a ring (not shown), to a crane and the two hooks 46, 47 of the lower locking devices are freed by withdrawing the pin 50 and pulling on the blade from the interior of the building. The frame is lifted by means of the crane by causing the tubes 31 and 32 to slide in the extremities 46 and 47 of the central arms until the latter occupy the relative position with respect to the frame which was previously that of the lower arms. After this, the two supports which had been withdrawn from their lower position are engaged in the holes 44' (in chain-dotted lines above) in order to lock the tubes 31 and 32, and the lifting cable of the crane is disengaged.

The device in accordance with FIG. 5 represents a working platform for a building or work of art, intended to be moved horizontally and, when so required, vertically along the outer face of the work.

It comprises a series of arms 51, a series of trolleys 52 and a working platform 54.

The arms 51 are put in position from the interior of the work through holes formed in the walls of the work, while the trolleys 52 are fast with the arms 51 and are fixed in position on the latter by pins 53. The working platform 54 is suspended under the trolleys 52. This platform is covered with a flooring and is provided with a guard-rail.

The coupling between the trolley and the platform is effected by rollers 55 (four rollers per trolley) which roll against the lower face of the upper flange, with the exception of two detachment portions 56 and 57 at each extremity which permit the platform to slide horizontally.

The utilization of the device is as follows:

The platform is always suspended from two trolleys 52.

In the position I (FIG. 6), the platform is suspended from the trolleys 52b and 52c. If the movement takes place in the direction of the arrow F, the trolley 52a which is at the end of the platform, no longer supports this latter. It is in fact located opposite the detachment portion 56. The trolley 52a is then freed from the arm 51a by removing the pin 53. The arm 51a is withdrawn from the interior of the work and the trolley 52a is retained on the platform for its future use (which will take place opposite the shaft D).

In the position II, the platform has advanced horizontally until its right-hand extremity has reached a fresh orifice or position for the installation of a new arm 51.

In the position II', the trolley liberated at the position I is put in place at 52d on the detachment portion 57 of the platform, the arm 51d being also placed in position and pinned to the trolley 52d. The platform up to this point is carried by the trolleys 52b and 52c. A horizontal movement will then engage the trolley 52d and disengage the trolley 52b (position III similar to position I).

Depending on the size of the device and the distances to cross between supporting points, the lateral movement is carried out either manually or by means of a traction device or wall-winch.

Any horizontal movement of the platform is only possible by acting on the safety devices.

These safety devices are spring stops which in the normal position are supported on the upper flange of the platform and block the latter through the intermediary of scotches. These stops are removed when the platform is operated.

The invention is not limited to the forms of embodiment described and shown, and includes all its alternative forms. Thus, for example, the masts 3 of FIG. 1, instead of being fixed directly on a platform, may be provided at their lower portions with trolleys of the kind described above, which permit a horizontal movement of the platform.

The whole of the device thus possesses at the same time the possibility of vertical movement and the possibility of horizontal movement.

What I claim is:

1. A suspended scaffold intended to be moved outside and against the wall of a building, said wall having a series of orifices therein disposed uniformly over the whole surface of said wall, said suspended scaffold comprising a plurality of horizontal supporting brackets each positioned in one of said orifices, a working platform, means for suspending said working platform from said supporting brackets, said suspension means comprising a plurality of guiding masts each of which is attached to said working platform, said suspension means further comprising slotted guide means at the outer end portion of each supporting bracket for receiving therein one of said masts, each of said masts having a length equal to at least the interval between two adjacent supporting brackets so that, in its operative condition, each guiding mast always engages in the slotted guide means of at least two supporting brackets to permit vertical sliding movement of said working platform, said platform being moved in either vertical direction by disengaging those of said supporting brackets which are located adjacent to the working platform, at least one winch with a cable having one of its extremities fixed to said winch and its other extremity fixed to said working platform, a pulley associated with each winch, and means for supporting said pulley upon at least one of said horizontal supporting brackets, said pulley returning the cable.

2. A suspended scaffold intended to be moved vertically outside and against the wall of a building, said wall having a group of orifices therein disposed uniformly over the whole surface of said wall, said suspended scaffold comprising a plurality of horizontal supporting brackets each situated within one of said orifices, means for suspending said working platform from said supporting brackets, said suspension means comprising a plurality of guiding masts each of which is connected to said working platform, each mast having a series of apertures therein, said suspension means further comprising slotted guide means located at the outer end portion of each supporting bracket for receiving therein one of said masts, and safety pins which are removably engaged through said mast apertures above said suspension means, each of said masts having a length equal to at least the distance between two vertically adjacent supporting brackets so that, in its operative condition, each guiding mast is always engaged within the slotted guide means of at least two supporting brackets arranged one directly above the other for permitting sliding movement of said working platform in a vertical direction, said platform being moved either upward or downward by successively disengaging those of said supporting brackets which are located in the vicinity of the working platform, at least one winch with a cable having one of its extremities fixed to said winch and the other of its extremities fixed to said working platform, a pulley associated with each winch, and means for removably mounting said pulley upon at least one of said horizontal supporting brackets, said pulley returning said cable.

3. A suspended scaffold intended to be moved vertically outside and against the wall of a building in course of construction, said suspended scaffold comprising a plurality of horizontal supporting brackets fixed in orifices pre-formed uniformly over the whole of said wall, a working platform, means for suspending said working platform from said brackets, said suspension means comprising a plurality of vertical guiding masts each of which is rigidly fixed to said working platform, said suspension means further comprising a vertically slotted guide means at the outer end portion of each supporting bracket for receiving therein one of said masts, each mast having a length equal to at least twice the interval between two vertically adjacent supporting brackets so that, in operative condition, each guiding mast can always be engaged into the vertically slotted guide means of at least two supporting brackets arranged one directly above the other for permitting sliding movement of said platform in a vertical direction, so that said working platform is moved upward by disengaging those of said supporting brackets which are located in the zone containing the working platform and placing the disengaged supporting brackets in the zone above said working platform, or vice versa for a downward movement of the working platform, at least one winch with a cable having one extremity fixed to said winch and the other extremity fixed to said platform, and a pulley associated with each winch, said pulley being supported by at least one of said horizontal supporting brackets and returning said cable.

4. A suspended scaffold intended to be moved vertically outside and against the wall of a building in course of construction, said suspended scaffold comprising a plurality of horizontal supporting brackets fixed in orifices pre-formed uniformly over the whole of said wall, a working platform, means for suspending said working platform from said brackets, said suspension means comprising a plurality of vertical guiding masts each of which is rigidly fixed to said working platform, said suspension means further comprising a vertically slotted guide means disposed at the outer end portion of each supporting bracket for receiving therein one of said masts, each mast having a length equal to at least twice the interval between two vertically adjacent supporting brackets so that, in operative condition, each guiding mast can always be engaged into the vertically slotted guide means of at least two supporting brackets arranged one directly above the other for permitting sliding movement of said platform in a vertical direction, so that said working platform is moved upwardly by removing those of said supporting brackets which are located in the zone adjacent to the working platform and placing the removed supporting brackets in the zone above said working platform, or vice versa for a downwards movement of the working platform, safety pins removably engaged through said vertical guiding masts above the guide means of said supporting brackets, at least one winch with a cable having one extremity fixed to said winch and the other extremity fixed to said platform, and a pulley associated with each winch, said pulley being supported by at least one of said horizontal supporting brackets and returning said cable.

5. A suspended scaffold intended to be moved vertically outside and against the wall of a building in course of construction, said wall having a plurality of orifices therein formed uniformly over the whole surface of said wall, said suspended scaffold comprising a plurality of horizontal supporting brackets each fixed in one of said orifices, a working platform, means for suspending said working platform from said supporting brackets, said suspension means comprising a plurality of vertical guiding masts each of which is rigidly fixed to said working platform, each mast having a plurality of apertures therein, and a vertically slotted guide means disposed at the outer end portion of each supporting bracket for receiving therein one of said masts, each slotted guide means comprising two parallel, spaced arms between which the associated vertical guiding mast slides, said suspension means further comprising safety pins removably engaged through said mast apertures and resting above said parallel, spaced arms, each of said masts having a length equal to at least twice the interval between two vertically adjacent supporting brackets so that, in operative condition, each guiding mast is always engaged in the vertically slotted guide means of at least two supporting brackets arranged one directly above the other for permitting sliding movement of said working platform in a vertical direction, so that said platform is moved upward by disengaging those of said supporting brackets which are located in the zone adjacent to the working platform and placing the disengaged supporting brackets in the zone above said working platform, or vice versa for a downward movement of the working platform, at least one winch with a cable having one extremity fixed to said winch and the other extremity fixed to said platform, and a pulley associated with each winch, said pulley being supported by at least one of said horizontal supporting brackets and returning said cable.

6. A suspended scaffold as claimed in claim 5, in which said vertically slotted guide means further comprises two series of rollers which are mounted between said two parallel spaced arms, so that the associated vertical guiding mast slides between said arms and said rollers.

7. A suspended scaffold as claimed in claim 3, in which said pulley associated with each winch is mounted at the lower end of a vertical support, the upper end of which carries gripping members resting on the outer end of one of said supporting brackets.

(References on following page)

References Cited in the file of this patent

UNITED STATES PATENTS

| | | |
|---|---|---|
| 182,380 | Miller | Sept. 19, 1876 |
| 382,901 | Randall et al. | May 15, 1888 |
| 597,818 | Foudu | Jan. 25, 1898 |
| 854,959 | Murray | May 28, 1907 |
| 896,213 | Kerfoot | Aug. 18, 1908 |
| 950,350 | Schlarmann | Feb. 22, 1910 |
| 1,724,713 | Johnston | Aug. 13, 1929 |
| 2,157,639 | Staggers | May 9, 1939 |
| 2,761,396 | Harlan | Sept. 4, 1956 |
| 2,893,786 | Faye | July 7, 1959 |

FOREIGN PATENTS

| | | |
|---|---|---|
| 950,755 | Germany | Oct. 18, 1956 |